(12) United States Patent
Silvesstrini et al.

(10) Patent No.: US 11,617,228 B2
(45) Date of Patent: Mar. 28, 2023

(54) AEROSOL-GENERATING SYSTEM AND A CARTRIDGE FOR AN AEROSOL-GENERATING SYSTEM HAVING A TWO-PART LIQUID STORAGE COMPARTMENT

(71) Applicant: Altria Client Services LLC, Richmond, VA (US)

(72) Inventors: Patrick Charles Silvesstrini, Neuchatel (CH); Ihar Nikolaevich Zinovik, Peseux (CH); Guillaume Frederick, Les-Geneveys-sur-Coffrane (CH)

(73) Assignee: Altria Client Services LLC, Richmond, VA (US)

( * ) Notice: Subject to any disclaimer, the term of this patent is extended or adjusted under 35 U.S.C. 154(b) by 4 days.

(21) Appl. No.: 15/903,612

(22) Filed: Feb. 23, 2018

(65) Prior Publication Data
US 2018/0242642 A1    Aug. 30, 2018

Related U.S. Application Data

(63) Continuation of application No. PCT/EP2018/051730, filed on Jan. 24, 2018.

(30) Foreign Application Priority Data

Feb. 24, 2017    (EP) .................................. 17157960

(51) Int. Cl.
*H05B 1/02*    (2006.01)
*A24B 15/167*    (2020.01)
(Continued)

(52) U.S. Cl.
CPC ......... *H05B 1/0227* (2013.01); *A24B 15/167* (2016.11); *A24F 40/42* (2020.01);
(Continued)

(58) Field of Classification Search
CPC ............................. A24F 47/008; A24F 47/002
See application file for complete search history.

(56) References Cited

U.S. PATENT DOCUMENTS 8,991,402 B2    3/2015    Bowen et al.
9,351,522 B2    5/2016    Safari
(Continued)

FOREIGN PATENT DOCUMENTS

AR         099324 A1      7/2016
CN      103462224 A     12/2013
(Continued)

OTHER PUBLICATIONS

Machine translation of TW201534229A (Year: 2021).*
(Continued)

*Primary Examiner* — Kelly M Gambetta
*Assistant Examiner* — Jennifer A Kessie
(74) *Attorney, Agent, or Firm* — Harness, Dickey & Pierce, P.L.C.

(57) ABSTRACT

The cartridge includes a storage compartment configured to contain a liquid, the storage compartment having a first portion and a second portion connected to one another by a liquid channel. The cartridge includes an airflow passage passing between the first portion and the second portion of the storage compartment, and an aerosol-generating element that is fluid permeable and is positioned between the first portion and the second portion of the storage compartment, the aerosol-generating element having a first side and a second side that oppose each other, the first side of the aerosol-generating element forming part of the airflow passage and the second side of the aerosol-generating element being in contact with the liquid from the second portion of the storage compartment.

17 Claims, 8 Drawing Sheets

(51) Int. Cl.
H05B 3/44 (2006.01)
H05B 3/03 (2006.01)
A24F 40/42 (2020.01)
A24F 40/485 (2020.01)
A24F 40/10 (2020.01)
A24F 40/46 (2020.01)

(52) U.S. Cl.
CPC ............ *A24F 40/485* (2020.01); *H05B 3/03* (2013.01); *H05B 3/44* (2013.01); *A24F 40/10* (2020.01); *A24F 40/46* (2020.01); *H05B 2203/021* (2013.01)

(56) References Cited

U.S. PATENT DOCUMENTS

| | | | |
|---|---|---|---|
| 9,420,831 | B2 | 8/2016 | Liu |
| 9,439,455 | B2 | 9/2016 | Alarcon et al. |
| 9,936,731 | B2 | 4/2018 | Hopps |
| 9,943,114 | B2 | 4/2018 | Batista |
| 9,986,765 | B2 | 6/2018 | Batista |
| 10,080,387 | B2 | 9/2018 | Phillips et al. |
| 10,149,498 | B2 | 12/2018 | Batista et al. |
| 10,159,284 | B2 | 12/2018 | Dickens |
| 10,231,486 | B2 | 3/2019 | Bowen et al. |
| 10,602,780 | B2 | 3/2020 | Chen |
| 10,687,552 | B2 | 6/2020 | Zinovik et al. |
| 10,869,505 | B2 | 12/2020 | Borkovec et al. |
| 2013/0192623 | A1 | 8/2013 | Tucker et al. |
| 2013/0228191 | A1 | 9/2013 | Newton |
| 2013/0319407 | A1 | 12/2013 | Liu |
| 2013/0327327 | A1 | 12/2013 | Edwards et al. |
| 2014/0000638 | A1* | 1/2014 | Sebastian ............ A24F 47/008 131/328 |
| 2015/0040929 | A1 | 2/2015 | Hon |
| 2015/0181943 | A1 | 7/2015 | Li et al. |
| 2015/0272217 | A1 | 10/2015 | Chen |
| 2016/0007654 | A1 | 1/2016 | Zhu |
| 2016/0073692 | A1 | 3/2016 | Alarcon et al. |
| 2016/0128386 | A1 | 5/2016 | Chen |
| 2016/0138795 | A1 | 5/2016 | Meinhart et al. |
| 2016/0262454 | A1 | 9/2016 | Sears et al. |
| 2016/0338410 | A1* | 11/2016 | Batista ............... G05D 23/2401 |
| 2016/0345630 | A1 | 12/2016 | Mironov et al. |
| 2016/0374399 | A1 | 12/2016 | Monsees et al. |
| 2017/0027226 | A1 | 2/2017 | Mironov et al. |
| 2017/0181472 | A1 | 6/2017 | Batista et al. |
| 2017/0251718 | A1 | 9/2017 | Armoush et al. |
| 2019/0045837 | A1 | 2/2019 | Spencer |
| 2019/0335819 | A1 | 11/2019 | Watanabe |

FOREIGN PATENT DOCUMENTS

| | | |
|---|---|---|
| CN | 203341007 U | 12/2013 |
| CN | 203341008 U | 12/2013 |
| CN | 103932401 A | 7/2014 |
| CN | 203969207 U | 12/2014 |
| CN | 104540406 A | 4/2015 |
| CN | 204617067 U | 9/2015 |
| CN | 105559151 A | 5/2016 |
| CN | 105876873 A | 8/2016 |
| CN | 205512340 U | 8/2016 |
| CN | 105939625 A | 9/2016 |
| CN | 206197017 U | 5/2017 |
| CN | 106998816 A | 8/2017 |
| DE | 102014114133 A1 | 3/2016 |
| DE | 202016100917 U1 | 3/2016 |
| EP | 2888963 A1 | 7/2015 |
| EP | 3053459 A2 | 8/2016 |
| JP | 05815559 | 5/2013 |
| JP | 2014/511175 A | 5/2014 |
| JP | 2017/519492 A | 7/2017 |
| JP | 2017/522021 A | 8/2017 |
| JP | 2017/522872 A | 8/2017 |
| KR | 20160102293 A | 8/2016 |
| KR | 20160119777 A | 10/2016 |
| RU | 2489948 C2 | 8/2013 |
| RU | 2597531 C2 | 9/2016 |
| RU | 2608289 C2 | 1/2017 |
| RU | 2657215 C2 | 6/2018 |
| TW | 201534229 A | 9/2015 |
| TW | 201620405 A | 6/2016 |
| UA | 116828 C2 | 5/2018 |
| WO | WO-2014/110119 A1 | 7/2014 |
| WO | WO-2015/043132 A1 | 4/2015 |
| WO | WO-2015/100361 A1 | 7/2015 |
| WO | WO-2015/114325 | 8/2015 |
| WO | WO-2015/117700 A1 | 8/2015 |
| WO | WO-2015/117702 A1 | 8/2015 |
| WO | WO-2015117704 A1 | 8/2015 |
| WO | WO-2015/189623 A1 | 12/2015 |
| WO | WO-2016/005530 A1 | 1/2016 |
| WO | WO-2016041206 A1 | 3/2016 |
| WO | WO-2016/075748 A1 | 5/2016 |
| WO | WO-2016/096497 A1 | 6/2016 |
| WO | WO-2016/096728 A1 | 6/2016 |
| WO | WO-2016/101141 A1 | 6/2016 |
| WO | WO-2016/145612 A1 | 9/2016 |
| WO | WO-2016156413 A1 | 10/2016 |
| WO | WO-2017/019402 A2 | 2/2017 |
| WO | WO-2017/042081 A1 | 3/2017 |
| WO | WO-2017/064051 A1 | 4/2017 |
| WO | WO-2018/153608 A1 | 8/2018 |
| WO | WO-2018/153732 A1 | 8/2018 |

OTHER PUBLICATIONS

Extended European Search Report #17157960.0 dated Sep. 21, 2017.
International Preliminary Report on Patentability dated Sep. 6, 2019, issued in corresponding International Application No. PCT/EP2018/053579.
International Search Report and Written Opinion dated Apr. 19, 2018 in related PCT Application No. PCT/EP2018/053579.
International Search Report and Written Opinion dated May 2, 2018 in related PCT Application No. PCT/EP2018/051730.
Extended European Search Report dated Dec. 20, 2017, for related EP Application No. 17157957.6.
Office Action dated Aug. 17, 2020, issued in corresponding U.S. Appl. No. 15/903,659.
Office Action dated Mar. 22, 2021, issued in corresponding Taiwanese Patent Application No. 107105796.
Advisory Action dated Mar. 29, 2021, issued in corresponding U.S. Appl. No. 15/903,659.
Russian Decision to Grant and Search Report dated May 26, 2021, issued in corresponding Russian Patent Application No. 2019126654.
Office Action dated Aug. 26, 2021, issued in corresponding U.S. Appl. No. 15/903,659.
Office Action dated Jun. 8, 2021, issued in corresponding Indian Patent Application No. 201917029535.
Office Action dated May 17, 2021, issued in corresponding Indonesian Patent Application No. PID201907026.
Allowance decision dated Nov. 18, 2021, issued in corresponding Taiwanese Application No. 107105602.
Allowance decision dated Oct. 22, 2021, issued in corresponding Indonesian Patent Application No. PID201907026.
Russian Decision to Grant and Search Report dated Jul. 5, 2021, issued in corresponding Russian Patent Application No. 2019129609.
Office Action dated Dec. 6, 2021, issued in corresponding U.S. Appl. No. 15/903,659.
Office Action dated Nov. 1, 2021, issued in corresponding Chinese Patent Application No. 201880009372.7.
Office Action dated May 25, 2021, issued in corresponding Taiwanese Patent Application No. 107105602.
Examination Report dated July 8, 2021, issued in corresponding Indian Application No. 201917025257.
Allowance Decision dated Jul. 29, 2021, issued in corresponding Taiwanese Application No. 107105796.

(56) References Cited

OTHER PUBLICATIONS

Ukrainian Decision to Grant dated Aug. 17, 2021, issued in corresponding Ukrainian Patent Application No. a201907116.
Singapore Decision to Grant dated Sep. 29, 2021, issued in corresponding Singapore Patent Application No. 11201907696Q.
Notice of Deficiencies dated Mar. 20, 2022, issued in corresponding Israeli Patent Application No. 268332.
Office Action dated Feb. 28, 2022 issued in corresponding Japanese Patent Application No. 2019-545349.
Notice of Allowance dated Mar. 24, 2022, issued in corresponding Israeli Patent Application No. 268334.
Notice of Allowance dated Mar. 23, 2022, issued in corresponding U.S. Appl. No. 15/903,659.
Office Action dated Dec. 7, 2021 issued in corresponding Argentine Patent Application No. 20180100438.
Appeal Notice dated Nov. 30, 2021, issued in corresponding Russian Patent No. RU-2,754,483-C2.
Standard GOST 2715-75.
International Standard GOST 25346-2013 (ISO 286-1:2010).
Standard GOST 3.1109-82.
Physical Encyclopedia, ed. A.M. Prokhorov, vol. 1, 1994, pp. 119, 614-615.
Gavrilov N.V., Kamenetsky A.S., ZhTF, 2007, vol. 77, issue 3, pp. 12-16.
Notice of Allowance dated Apr. 7, 2022, issued in corresponding U.S. Appl. No. 15/903,659.
Getmanov V.N. PMTF, 1991, No. 1, p. 3-8.
Office Action dated Feb. 21, 2022 issued in corresponding Japanese Patent Application No. 2019-546182.
Notice of Allowance dated Apr. 20, 2022, issued in corresponding U.S. Appl. No. 15/903,659.
Office Action dated Dec. 3, 2021 issued in corresponding Chinese Patent Application No. 201880009641.
Notice of Allowance dated May 3, 2022, issued in corresponding European Patent Application No. 18 705 140.4.
Office Action dated May 16, 2022, issued in corresponding Chinese Patent Application No. 201880009372.7.
Decision to Grant dated Jul. 4, 2022 issued in corresponding Japanese Patent Application No. 2019-545349.
Notice of Allowance dated Jul. 22, 2022 issued in corresponding Chinese Patent Application No. 201880009641.
International Search Report and Written Opinion for corresponding European Application No. PCT/EP2018/071551 dated Oct. 29, 2018.
International Preliminary Report on Patentability dated Apr. 2, 2020 in International Application No. PCT/EP2018/071551.
Official Notification dated Nov. 11, 2021, issued in corresponding Russian Patent Application No. 2020113626/03.
Russian Office Action and Search Report dated Apr. 8, 2022, issued in corresponding Russian Patent Application No. 2020113626.
Office Action dated Nov. 24, 2021, issued in corresponding U.S. Appl. No. 16/184,322.
Office Action dated Jun. 10, 2022, issued in corresponding U.S. Appl. No. 16/184,322.
Notice of Allowance dated Sep. 14, 2022, issued in corresponding U.S. Appl. No. 15/903,659.
Notice of Allowance dated Jul. 25, 2022, issued in corresponding Israeli Patent Application No. 268332.
Office Action dated Sep. 6, 2022, issued in corresponding Brazilian Patent Application No. 1120190143009.
Additional Arguments for Appeal dated Feb. 10, 2022, issued in corresponding Russian Patent No. RU-2,754,483-C2.
Annex to Additional Arguments for Appeal dated Mar. 4, 2022, issued in corresponding Russian Patent No. RU-2,754,483-C2.
Chemical Resistance Chart by Burkert, 2018 https://vvww.burkert.com/en/content/download/9318/334992/iile/Chemical-Resistance-Chart.pdf?id=48.
Chemical Compatibility Chart by IDEX, 2022, https://www.idex-hs.com/literature-tools/educational-materials/chemical-compatibility/ .
Aditya Ramgobin et al., 'A Case Study of Polyether Ether Ketone (I): Investigating the Thermal and Fire Behavior of a High-Performance Material' *Polymers*, vol. 12, No. 1789, Aug. 2020.
Chemical Compatibility Table by Colder, Aug. 2011, https://www.usplastic.com/cataloa/files/charts/Colder%20CC.pdf.
Chemical Compatibility Table by Colder, Jan. 2010, https://www.tom-parker.co.uk/upload/files/literature/CPC_Chemical_Compatibility_Chart (261KB).pdf.
Excerpt from PEEK polymer chemical compatibility table by polymer manufacturer Victrex: Chemical Resistance; Victrex Peek Polymers, 2016, https://www.victrex.com/en/technical-guides.
Excerpt from technical guides in respect of PEEK polymer properties by polymer manufacturer Victrex: Safety Data Sheet, Nov. 2021, https://www.victrex.com/en/technical-guides .
Excerpt from Material Safety Data Sheet for PEEK polymer by polymer manufacturer Victrex: Technical Guide, 2016, https://www.victrex.com/en/msds .
Michael O'Conner, 'Philip Morris delayed e-vapor launch as vaping fears spread' S&P Global, Feb. 2020, https://www.spglobal.com/marketintelligence/en/news-insights/latest-news-headlines/philip-morris-delayed-e-vapor-launch-as-vaping-fears-spread-56987277.
Ukrainian Decision to Grant dated Aug. 9, 2022, issued in corresponding Ukrainian Patent Application No. a 2019 07117.
Russian Decision to Grant dated Jul. 6, 2022, issued in corresponding Russian Patent Application No. 2022103042.
Office Action dated Aug. 2, 2022, issued in corresponding Brazilian Patent Application No. 1120190149759.
Office Action dated Jul. 21, 2022, issued in corresponding Brazilian Patent Application No. 112020003506-8.
Russian Decision to Grant dated Jul. 6, 2022, issued in corresponding Russian Patent Application No. 2020113626.
Office Action dated Sep. 7, 2022, issued in corresponding Israeli Patent Application No. 272286.
Office Action dated Oct. 26, 2022, issued in corresponding U.S. Appl. No. 16/184,322.
Notice of Allowance dated Oct. 21, 2022 issued in corresponding Chinese Patent Application No. 201880009372.7.
Search Report dated Oct. 25, 2022, issued in corresponding Malaysian Patent Application No. PI2019003605.
Notice of Allowance dated Nov. 10, 2022, issued in corresponding U.S. Appl. No. 15/903,659.
Decision of Grant dated Nov. 16, 2022 in corresponding to Japanese Application No. 2019-546182.
Examination Report dated Nov. 17, 2022, issued in corresponding Australian Application No. 2018224736.
Examination Report dated Nov. 21, 2022, issued in corresponding Australian Application No. 2018226112.
Examination Report dated Nov. 10, 2022, issued in corresponding Malaysian Patent Application No. PI2019004849.
Office Action dated Oct. 11, 2022 in corresponding Japanese Application No. 2020-515922.
Office Action dated Dec. 13, 2022 issued in corresponding Korean Patent Application No. 10-2019-7022821.

* cited by examiner

AEROSOL-GENERATING SYSTEM AND A CARTRIDGE FOR AN AEROSOL-GENERATING SYSTEM HAVING A TWO-PART LIQUID STORAGE COMPARTMENT

CROSS-REFERENCE TO RELATED APPLICATIONS

This application is a continuation of, and claims priority to, international application number PCT/EP2018/051730, filed on Jan. 24, 2018, and further claims priority under 35 USC § 119 to European patent application number 17157960.0, filed on Feb. 24, 2017, the entire contents of each of which are incorporated herein by reference.

FIELD

Example embodiments relate to an aerosol-generating system and a cartridge for an aerosol-generating system that is configured to heat a liquid aerosol-forming substrate to generate an aerosol. In particular example embodiments relate to a handheld aerosol-generating system configured to generate aerosol.

DESCRIPTION OF RELATED ART

In handheld aerosol-generating systems that generate an aerosol from a liquid aerosol-forming substrate there can be some means of transporting the liquid to the vicinity of an aerosol-generating element to replenish liquid that has been aerosolised by the aerosol--generating element. However, it can be difficult to ensure that enough liquid is transported to the vicinity of the aerosol-generating element without oversupply of liquid, leading to leaks and inclusion of large liquid droplets in the aerosol.

SUMMARY

At least one example embodiment is directed toward a cartridge.

In one embodiment, the cartridge for an aerosol-generating system, the cartridge includes a storage compartment configured to contain a liquid, the storage compartment having a first portion and a second portion connected to one another by a liquid channel, the storage compartment and liquid channel being configured to allow the liquid in the first portion to pass to the second portion through the liquid channel; an airflow passage passing between the first portion and the second portion of the storage compartment; and an aerosol-generating element that is fluid permeable and is positioned between the first portion and the second portion of the storage compartment, the aerosol-generating element having a first side and a second side that oppose each other, the first side of the aerosol-generating element forming part of the airflow passage and the second side of the aerosol-generating element being in contact with the liquid from the second portion of the storage compartment.

In one embodiment, the first portion of the storage compartment has a larger liquid storage capacity than the second portion of the storage compartment.

In one embodiment, the second portion of the storage compartment contains a capillary material in contact with the second side of the aerosol-generating element.

In one embodiment, the cartridge further includes a housing having a connection end and a mouth end remote from the connection end, the connection end configured to connect to a control body of an aerosol-generating system, the second side of the aerosol-generating element facing the connection end and the first side of the aerosol-generating element facing the mouth end.

In one embodiment, the aerosol-generating element is closer to the connection end than to the mouth end.

In one embodiment, the cartridge further includes a housing defining an air inlet; and a mouthpiece portion having a mouth end opening, the airflow passage extending from the air inlet, between the first portion and the second portion of the storage compartment, to the mouth end opening, wherein the first portion of the storage compartment is positioned between the aerosol-generating element and the mouth end opening.

In one embodiment, the first and second sides of the aerosol-generating element are planar.

In one embodiment, the aerosol-generating element is a heating element, the heating element defining a fluid passage that is at least one of a plurality of interstices and apertures, the fluid passage extending through the heating element.

In one embodiment, the cartridge further includes a heater assembly, the heater assembly including, the heating element, and electrical contacts, the electrical contacts electrically connected to the heating element.

In one embodiment, the electrical contacts are exposed through a connection end of the cartridge.

In one embodiment, the storage compartment further includes a heater mount, the heater mount being molded over the heater assembly.

In one embodiment, the first portion of the storage compartment, the second portion of the storage compartment and the liquid channel is configured to allow the liquid in the first portion of the storage compartment to reach the aerosol-generating element only through the second portion of the storage compartment.

At least another example embodiments is directed toward an aerosol-generating system.

In one embodiment, the aerosol-generating system includes a cartridge including, a storage compartment configured to contain a liquid, the storage compartment having a first portion and a second portion connected to one another by a liquid channel, the storage compartment and liquid channel being configured to allow the liquid in the first portion to pass to the second portion through the liquid channel; an airflow passage passing between the first portion and the second portion of the storage compartment; and an aerosol-generating element that is fluid permeable and is positioned between the first portion and the second portion of the storage compartment, the aerosol-generating element having a first side and a second side that oppose each other, the first side of the aerosol-generating element forming part of the airflow passage and the second side of the aerosol-generating element being in contact with the liquid from the second portion of the storage compartment; and a control body connected to the cartridge, the control body configured to control a supply of electrical power to the aerosol-generating element.

In one embodiment, the aerosol-generating system further includes a first pair of electrical contacts in the control body; and a second pair of electrical contacts in the cartridge, the first and second pair of electrical contacts being configured to electrically connect the control body to the aerosol-generating element.

In one embodiment, the aerosol-generating system is a handheld aerosol-generating system.

BRIEF DESCRIPTION OF THE DRAWINGS

Features described in relation to one example embodiment may equally be applied to other example embodiments.

Example embodiments will now be described with reference to the following drawings.

DETAILED DESCRIPTION

Figure 1:
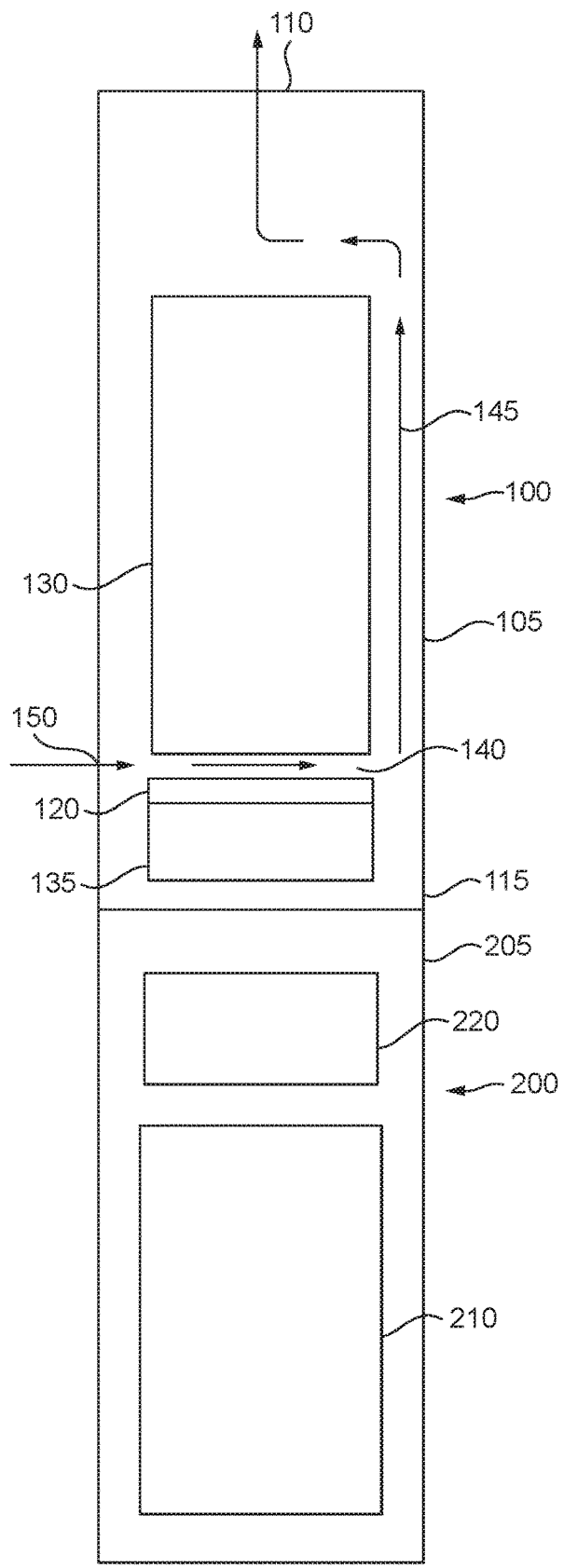
FIG. 1 illustrates an aerosol-generating system, in accordance with an example embodiment.

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and,; or components, but do not preclude the presence or addition of one or more other features, integers, steps, operations, elements, components, and/or groups thereof.

It will be understood that, although the terms first, second, etc. may be used herein to describe various elements, regions, layers and/or sections, these elements and/or sections should not be limited by these terms. These terms are only used to distinguish one element or section from another section. Thus, a first element, or section discussed below could be termed a second element, or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will he understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not he construed as limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

General Methodology

Gravity can have a significant role to play in liquid transport within an aerosol-generating system. Typically, the liquid is provided with a cartridge, containing both the liquid and an aerosol--generating element in the form of a heating element. The cartridge has a mouth end through which generated aerosol (also known as a generated vapor) is drawn, and a connection end opposite the mouth end which connects to a control unit containing control circuitry and a power supply. The heating element is typically located close to the connection end to allow for easy connection to the power supply, with the liquid (also known as a pre-vapor formulation) held in a storage compartment between the heating element and the mouth end of the cartridge. During typical operation of this type of system, the highest (e.g., most elevated) part of the system is the mouth end of the cartridge, so that gravity acts to pull liquid down toward the heater. This can result in an oversupply of liquid at the heating element.

An alternative arrangement is to place the heating element in a position higher (e.g., more elevated) relative to the liquid storage compartment during typical operation, and to cause a capillary material to deliver liquid to the heater against the force of gravity. But, this can lead to an undersupply or inconsistent supply of liquid to the heating element.

An arrangement is provided for an aerosol-generating system in which an adequate and consistent supply of liquid is delivered to the aerosol-generating element even as the liquid storage compartment becomes depleted, while liquid leakage is minimized or prevented, and where complex elements such as pumps are not required.

Specific Example Embodiments

In an example embodiment there is provided a cartridge for an aerosol-generating system (also known as a vapor-generating system, or vaporizer), the cartridge including, a storage compartment containing a liquid aerosol-forming substrate, the storage compartment having a first portion and a second portion connected to one another so that liquid in the first portion can pass to the second portion; an air flow passage passing between the first portion and the second portion of the storage compartment; a fluid permeable aerosol-generating element (also known as a vapor-generating element) positioned between the first portion and the second portion of the storage compartment and having a first side and a second side opposing the first side, the first side of the aerosol-generating element forming part of the airflow passage and the second side of the aerosol-generating element being in contact with liquid from the second portion of the storage compartment, so that liquid aerosol-forming substrate in the first portion of the storage compartment can reach the fluid permeable aerosol-generating element only through the second portion of the storage compartment.

The first portion and the second portion may be connected to one another by a liquid channel so that liquid (also known as a pre-vapor formulation) in the first portion can pass to the second portion through the liquid channel.

The aerosol-generating element may be a heating element. Alternatively, the aerosol-generating element may be a vibrating element.

In an embodiment, the first portion of the storage compartment has a larger liquid storage capacity than the second portion of the storage compartment. In an embodiment, the first portion of the storage compartment is larger than the second portion of the storage compartment. In operation the first portion of the storage compartment may be positioned above the aerosol-generating element. Having the first portion of the storage compartment larger than the second portion of the storage compartment ensures that liquid is delivered from the first portion of the storage compartment to the second portion of the storage compartment, and to the aerosol-generating element, during operation, via the force of gravity.

In an embodiment, the second portion of the storage compartment contains a capillary material in contact with the second side of the aerosol-generating element. The capillary material delivers liquid aerosol-forming substrate (also referred to as a vapor-forming substrate) to the aerosol-generating element against the force of gravity. By requiring the liquid aerosol forming substrate to be distributed against the force of gravity to reach the aerosol-generating element, a possibility of large droplets of the liquid entering the airflow passage is reduced.

The capillary material may be made of a material capable of guaranteeing that there is liquid aerosol--forming substrate in contact with at least a portion of the surface of the aerosol-generating element. The capillary material may extend into interstices or apertures in the aerosol-generating element (where the interstices and/or apertures are referred to as a "fluid passage" in the aerosol-generating element). The aerosol-generating element may draw the liquid aerosol-forming substrate into the interstices or apertures via capillary action.

A capillary material is a material that actively conveys liquid from one end of the material to another. The capillary material may have a fibrous or spongy structure. In an embodiment, the capillary material includes a bundle of capillaries. For example, the capillary material may include a plurality of fibers or threads or other fine bore tubes. The fibers or threads may be generally aligned to convey liquid aerosol-forming substrate towards the aerosol-generating element. Alternatively, the capillary material may include a sponge-like or foam-like material. The structure of the capillary material forms a plurality of small bores or tubes, through which the liquid aerosol-forming substrate can be transported via capillary action. The capillary material may include any suitable material or combination of materials. Examples of suitable materials are a sponge or foam material, ceramic- or graphite-based materials in the form of fibers or sintered powders, foamed metal or plastics material, a fibrous material, for example made of spun or extruded fibers, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and vapor pressure, which allows the liquid aerosol-forming substrate to be transported through the capillary medium via capillary action.

Alternatively, or in addition, the storage compartment may contain a carrier material for holding a liquid aerosol-forming substrate. The carrier material may be in the first portion of the storage compartment, the second portion of the storage compartment or both the first and second portions of the storage compartment. The carrier material may be a foam, a sponge, or a collection of fibers. The carrier material may be formed from a polymer or co-polymer. In one embodiment, the carrier material is a spun polymer. The aerosol-forming substrate may be released into the carrier material. For example, the liquid aerosol-forming substrate may be provided in a capsule.

The cartridge may include a housing having a connection end and a mouth end remote from the connection end, the connection end configured to connect to a control body of an aerosol-generating system. The second side of the aerosol-generating element may face the connection end and the first side of the aerosol-generating element may face the mouth end. An electrical current may be delivered to the aerosol-generating element from a connected control body through the connection end of the housing.

In an embodiment, the aerosol-generating element is closer to the connection end than to the mouth end opening. This allows for a simple and short electrical connection path between a power source in the control body and the aerosol-generating element.

The air flow passage extends between the first and second portions of the storage compartment. Additionally, the air flow passage may extend through the first portion of the storage compartment. For example, the first portion of the storage compartment may have an annular cross section, with the air flow passage extending from the aerosol-generating element to a mouth end opening through the first portion of the storage compartment. Alternatively, the air flow passage may extend from the aerosol--generating element to the mouth end opening adjacent to the first portion of the storage compartment.

The first and second sides of the aerosol-generating element may be substantially planar. The aerosol-generating element may be a heating element. The heating element may include a substantially flat heating element to allow for simple manufacturing. Geometrically, the term "substantially flat" heating element is used to refer to a heating element that is in the form of a substantially two dimensional topological manifold. Thus, the substantially flat heating element extends in two dimensions to form a surface that is substantial relative to the portion of the heating element that extends in a third dimension. In particular, the dimensions of the substantially flat heating element in the two dimensions, constituting the surface, is at least five times larger the portion of the heating element that extends in the third dimension (where the portion of the heating element extending in the third dimension does so at an angle that is about normal to a plane of the surface). An example of a substantially flat heating element is a structure between two substantially imaginary parallel surfaces, wherein the distance between these two imaginary surfaces is substantially smaller than the extension within the surfaces. In an embodiment, the substantially flat heating element is planar. In another embodiment, the substantially flat heating element is curved along one or more dimensions, for example forming a dome shape or a bridge shape.

The heating element may include a plurality of interstices or apertures extending from the second side to the first side and through which fluid may pass.

In an embodiment, the aerosol-generating element may alternatively, or in addition, include a vibrating membrane or mesh. A piezoelectric element may be used to vibrate the membrane or mesh. Liquid aerosol-forming substrate passing through apertures or interstices in the vibrating membrane or mesh may form droplets that form an aerosol in an airflow through the system. The aerosol-generating element may alternatively, or in addition, include a plurality of droplet ejectors, such as bubble jet nozzles that may utilize a piezoelectric or thermal ejection mechanism.

The heating element may include a plurality of electrically conductive filaments. The term "filament" is used throughout this document to refer to an electrical path arranged between two electrical contacts. A filament may branch off and diverge into several paths or filaments, respectively, or may converge from several electrical paths into one path. A filament may have a round, square, flat or any other form of cross-section. A filament may be arranged in a straight or curved manner.

The heating element may be an array of filaments, for example arranged parallel to each other. In an embodiment, the filaments may form a mesh. The mesh may be woven or non-woven. The mesh may be formed using different types of weave or lattice structures. Alternatively, the electrically conductive heating element may consist of an array of filaments or a fabric of filaments. The mesh, array or fabric of electrically conductive filaments may also be characterized by its ability to retain liquid.

In an embodiment, a substantially flat heating element may be constructed from a wire that is formed into a wire mesh. In an embodiment, the mesh has a plain weave design. In an embodiment, the heating element is a wire grill made from a mesh strip.

The electrically conductive filaments may define interstices between the filaments and the interstices may have a width of between 10 micrometres and 100 micrometres. In an embodiment, the filaments provide a capillary action (capillary force) within the interstices, so that liquid is drawn into the interstices, thereby increasing the contact area between the heating element and the liquid aerosol-forming substrate.

The electrically conductive filaments may form a mesh of a size between 60 and 240 filaments per centimetre (+/−10 percent). In an embodiment, the mesh density is between 100 and 140 filaments per centimetres (+/−10 percent). The mesh density may also be approximately 115 filaments per centimetre. The width of the interstices may be between 100 micrometres and 25 micrometres, or between 80 micrometres and 70 micrometres, or approximately 74 micrometres. The percentage of open area of the mesh, which is the ratio of the area of the interstices to the total area of the mesh, may be between 40 percent and 90 percent, or between 85 percent and 80 percent, or approximately 82 percent.

In an embodiment, the electrically conductive filaments may have a diameter of between 8 micrometres and 100 micrometres, or between 10 micrometres and 50 micrometres, or between 12 micrometres and 25 micrometres, or approximately 16 micrometres. The filaments may have a round cross section or may have a flattened cross-section.

In an embodiment, the area of the mesh, array or fabric of electrically conductive filaments may be small, for example less than or equal to 50 square millimetres, or less than or equal to 25 square millimetres, or approximately 15 square millimetres. The size is chosen to incorporate the heating element into a handheld system. The mesh, array or fabric of electrically conductive filaments can be less than or equal to 50 square millimetres to reduce the total power required to heat the mesh, array or fabric of electrically conductive filaments while still ensuring sufficient contact between the mesh, array or fabric of electrically conductive filaments and the liquid aerosol-forming substrate. The mesh, array or fabric of electrically conductive filaments may, for example, be rectangular and have a length between 2 millimetres to 10 millimetres, with a width between 2 millimetres and 10 millimetres. In an embodiment, the mesh has dimensions of approximately 5 millimetres by 3 millimetres.

The filaments of the heating element may be formed from any material with suitable electrical properties. Suitable materials include, but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may include doped or undoped ceramics. Examples of suitable doped ceramics include doped silicon carbides. Examples of suitable metals include titanium, zirconium, tantalum and metals from the platinum group.

Examples of suitable metal alloys include stainless steel, constantan, nickel-, cobalt-, chromium-, aluminum-, titanium-, zirconium-, hafnium-, niobium-, molybdenum, tantalum-, tungsten-, tin-,gallium-, manganese- and iron-containing alloys, and super-alloys based on nickel, iron, cobalt, stainless steel, Timetal®, iron-aluminum based alloys and iron-manganese-aluminum based Timetal® is a registered trade mark of Titanium Metals Corporation. The filaments may be coated with one or more insulators. In an embodiment, materials for the electrically conductive filaments are stainless steel and graphite, and 300 series stainless steel such as AISI 304, 316, 304L, 316L. Additionally, the electrically conductive heating element may include combinations of the above materials. A combination of materials may be used to improve the control of the resistance of the substantially flat heating element. For example, materials with a high intrinsic resistance may be combined with materials with a low intrinsic resistance. This may be advantageous if one of the materials is beneficial from a standpoint of price, machinability or other physical and chemical parameters, for example. In an embodiment, a substantially flat filament arrangement with increased resistance can be used to reduce parasitic losses. In an embodiment, high resistivity heaters can be used to allow more efficient utilization of battery energy.

In an example embodiment, the filaments are made of wire. In another example embodiment, the wire is made of metal, such as stainless steel.

The electrical resistance of the mesh, array or fabric of electrically conductive filaments of the heating element may be between 0.3 Ohms and 4 Ohms. In an embodiment, the electrical resistance is equal or greater than 0.5 Ohms. In another embodiment, the electrical resistance of the mesh, array or fabric of electrically conductive filaments is between 0.6 Ohms and 0.8 Ohms, or about 0.68 Ohms. The electrical resistance of the mesh, array or fabric of electrically conductive filaments may be at least an order of magnitude, or at least two orders of magnitude, greater than the electrical resistance of electrically conductive contact areas. This ensures that the heat generated by passing current through the heating element is localized to the mesh or array of electrically conductive filaments. It is advantageous to have a low overall resistance for the heating element if the system is powered by a battery. A low resistance, high current system allows for the delivery of high power to the heating element. This allows the heating element to heat the electrically conductive filaments to a desired temperature quickly.

In an example embodiment, the heating element may include a heating plate in which an array of apertures is formed. The apertures may be formed by etching or machining, for example. The plate may be formed from any material with suitable electrical properties, such as the materials described above in relation to filaments of a heating element.

The first side of the aerosol-generating element may directly face the mouth end opening. This orientation of a planar aerosol-generating element allows for simple assembly of the cartridge during manufacturing.

The heating element may be part of a heater assembly. The heater assembly may include the heating element and electrical contact portions (also referred to as "electrical contacts"), electrically connected to the heating element. The electrical contact portions may be two electrically conductive contact pads. The electrically conductive contact pads may be positioned at an edge area of the heating element. In an embodiment, the at least two electrically conductive contact pads may be positioned on extremities of the heating element. An electrically conductive contact pad may be fixed directly to electrically conductive filaments of the heating element. An electrically conductive contact pad may include a tin patch. In an alternative embodiment, an electrically conductive contact pad may be integral with the heating element.

The contact portions may be exposed through a connection end of the housing to allow for contact with electrical contact pins in a control body of an aerosol-generating system.

The storage compartment may include a storage compartment housing. The aerosol-generating element may be fixed to the storage compartment housing. The storage compartment housing may include a molded element or heater mount, the molded element or heater mount being molded over the heater assembly or other type of aerosol-generating element. The molded portion or heater mount may cover a portion of the first side of the heater assembly or aerosol-generating element to isolate electrical contact portions from the airflow passage, and may cover at least a portion of the second side of the heater assembly or aerosol-generating element to isolate the electrical contact portions from the liquid aerosol-forming substrate.

The heater mount may include at least one wall extending from the second side of the heater assembly, the at least one wall forming part of the second portion of the liquid storage compartment. The heater mount may define a liquid flow path from a first side of the heater assembly to a second side of the heater assembly.

The liquid storage compartment may hold a liquid aerosol-forming substrate. As used herein with reference to the example embodiments, an aerosol-forming substrate is a substrate capable of releasing volatile compounds that can form an aerosol (also known as a vapor). Volatile compounds may be released by heating the aerosol-forming substrate. Volatile compounds may be released by moving the aerosol-forming substrate through passages of a vibratable element.

The aerosol-forming substrate (also known as a vapor-forming substrate) may be liquid at room temperature. The aerosol-forming substrate may include both liquid and solid elements. The liquid aerosol-forming substrate may include nicotine. The nicotine containing liquid aerosol-forming substrate may be a nicotine salt matrix. The liquid aerosol-forming substrate may include plant-based material. The liquid aerosol-forming substrate may include tobacco. The liquid aerosol-forming substrate may include a tobacco-containing material containing volatile tobacco flavor compounds, which are released from the aerosol-forming substrate upon heating. The liquid aerosol-forming substrate may include homogenised tobacco material. The liquid aerosol-forming substrate may include a non-tobacco-containing material. The liquid aerosol--forming substrate may include homogenised plant-based material.

The liquid aerosol-forming substrate may include one or more aerosol-formers (also known as vapor-formers). An aerosol-former is any suitable known compound or mixture of compounds that facilitates formation of a dense and stable aerosol and that is substantially resistant to thermal degradation at the temperature of operation of the system. Examples of suitable aerosol formers include glycerine and propylene glycol. Suitable aerosol-formers include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may include water, solvents, ethanol, plant extracts and natural or artificial flavors.

The liquid aerosol-forming substrate may include nicotine and at least one aerosol former. The aerosol former may be glycerine or propylene glycol. The aerosol former may include both glycerine and propylene glycol. The liquid aerosol-forming substrate may have a nicotine concentration of between about 0.5% and about 10%, or about 2%.

The housing may be formed from a mouldable plastic material, such as polypropylene (PP) or polyethylene terephthalate (PET). The housing may form a part or all of a wall of the storage compartment. The housing and storage compartment may be integrally formed. Alternatively, the storage compartment may be formed separately from the housing and assembled to the housing.

The cartridge may include a removable mouthpiece through which aerosol may be drawn. The removable mouthpiece may cover the mouth end opening. Alternatively, the cartridge may be configured to allow air to be drawn directly from the mouth end opening.

The cartridge may be refillable with a liquid aerosol-forming substrate. Alternatively, the cartridge may be designed to be discarded when the storage compartment becomes depleted of liquid aerosol-forming substrate. In an embodiment, there is provided a cartridge for an aerosol-generating system, the cartridge including, a housing having a mouth end opening; a storage compartment within the housing and containing a liquid aerosol-forming substrate; a fluid permeable aerosol-generating element within the housing and having a first side and a second side opposing the first side, the first side of the aerosol-generating element being closer to the mouth end opening than the second side of the aerosol-generating element, and the second side of the aerosol-generating element being in contact with liquid from the storage compartment; and an air flow passage extending from the first side of the aerosol-generating element to the mouth end opening; wherein a first portion of the storage compartment is positioned between the aerosol-generating element and the mouth end opening and a second portion of the storage compartment is positioned on an opposite side of the aerosol-generating element to the mouth end opening.

The phrase "positioned between" means that a straight line from the aerosol-generating element to the mouth end opening must pass through or past the first portion of the storage compartment. The air flow passage may pass through the storage portion.

In an embodiment, there is provided an aerosol-generating system including a cartridge and a control body connected to the cartridge, the control body configured to control a supply of electrical power to the aerosol-generating element.

The control body may include at least one electrical contact element configured to provide an electrical connection to the aerosol-generating element when the control body is connected to the cartridge. The electrical contact element may be elongated. The electrical contact element may be spring-loaded. The electrical contact element may contact an electrical contact pad in the cartridge.

The control body may include a connecting portion for engagement with the connection end of the cartridge. The control body may include a power supply. The control body may include control circuitry configured to control a supply of power from the power supply to the aerosol-generating element.

The control circuitry may include a microcontroller. The microcontroller may be a programmable microcontroller. The control circuitry may include further electronic elements. The control circuitry may be configured to regulate a supply of power to the aerosol-generating element. Power may be supplied to the aerosol-generating element continuously following activation of the system, or may be supplied intermittently, such as when a draw of air occurs in the device. The power may be supplied to the aerosol-generating element in the form of pulses of electrical current.

The control body may include a power supply arranged to supply power to at least one of the control system and the aerosol-generating element. The aerosol-generating element may include an independent power supply. The aerosol-generating system may include a first power supply arranged to supply power to the control circuitry and a second power supply configured to supply power to the aerosol-generating element.

The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a sufficient capacity to allow for the continuous generation of aerosol for a period of around six minutes, or for a period that is a multiple of six minutes. In an example embodiment, the power supply may have sufficient capacity to allow for a determined number of discrete activations of the atomizing assembly.

The aerosol-generating system may be a handheld aerosol-generating system. The handheld aerosol-generating system may be configured to allow an aerosol to be drawn through the mouth end opening. The aerosol-generating system may have a total length between about 30 mm and about 150 mm. The aerosol-generating system may have an external diameter between about 5 mm and about 30 mm.

Although the system of the example embodiments has been described as including a cartridge and a control body, it is possible to implement a one-piece system. In an example embodiment, there is provided an aerosol-generating system including, a housing having an air inlet and mouth end opening; a storage compartment within the housing containing a liquid aerosol-forming substrate, the storage compartment having a first portion and a second portion connected to one another so that liquid in the first portion can pass to the second portion; an air flow passage passing from the air inlet between the first portion and the second portion of the storage compartment to the mouth end opening; a fluid permeable aerosol-generating element positioned between the first portion and the second portion of the storage compartment and having a first side and a second side opposing the first side, the first side of the aerosol-generating element forming part of the airflow passage and the second side of the aerosol-generating element being in contact with liquid from the second portion of the storage compartment, so that liquid aerosol-forming substrate in the first portion of the storage compartment must pass to the second portion of the storage compartment to reach the fluid permeable aerosol-generating element, a power supply within the housing connected to the aerosol-generating element; and control circuitry within the housing and configured to control a supply of power from the power supply to the aerosol-generating element.

In an example embodiment, there is provided an aerosol-generating system including, a housing having a mouth end opening; a storage compartment within the housing and containing a liquid aerosol-forming substrate; a fluid permeable aerosol-generating element within the housing and having a first side and a second side opposing the first side, the first side of the aerosol-generating element being closer to the mouth end opening than the second side of the aerosol-generating element, and the second side of the aerosol-generating element being in contact with liquid from the storage compartment; an air flow passage extending from the first side of the aerosol-generating element to the mouth end opening; a power supply within the housing connected to the aerosol-generating element; and control circuitry within the housing and configured to control a supply of power from the power supply to the aerosol-generating element; wherein a first portion of the storage compartment is positioned between the aerosol-generating element and the mouth end opening and a second portion of the storage compartment is positioned on an opposite side of the aerosol-generating element to the mouth end opening.

The aerosol-generating element may be generally planar. The second side of the aerosol-generating element may be positioned outside of the air flow passage. The second side of the aerosol-generating element may be in contact with the liquid from the storage compartment but not in contact with air in the air flow passage.

The first portion of the storage compartment and the second portion of the storage compartment may be connected to one another by a liquid channel. so that liquid in the first portion can pass to the second portion through the liquid channel.

The storage compartment may be refillable with a liquid aerosol-forming substrate. Alternatively, the system may be designed to be discarded when the storage compartment becomes depleted of the liquid aerosol-forming substrate.

In an example embodiment, the housing may be elongated. The housing may be made from any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle. The housing may include any of the features of the housing described above.

In an example embodiment, the cartridge, control body or aerosol-generating system may include a puff detector (sensor) in communication with the control circuitry. The puff detector may be configured to detect when air is drawn through the airflow passage.

In an example embodiment, the cartridge, control body or aerosol-generating system may include a temperature sensor in communication with the control circuitry. The cartridge, control body or aerosol-generating system may include an input element, such as a switch or button. The input element may enable the system to be turned on and off.

The cartridge, control body or aerosol-generating system may also include indication means for indicating the determined amount of liquid aerosol-forming substrate held in the liquid storage portion. The control circuitry may be configured to activate the indication means after a determination of the amount of liquid aerosol-forming substrate held in the liquid storage portion has been made.

The indication means may include one or more of lights, such as light emitting diodes (LEDs), a display, such as an LCD display and audible indication means, such as a loudspeaker or buzzer and vibrating means. The control circuitry may be configured to light one or more of the lights, display an amount on the display, emit sounds via the loudspeaker or buzzer and vibrate the vibrating means.

Features of one aspect of the example embodiments may be applied to the other aspects of the example embodiments.

Example Structural Embodiments

FIG. 1 is an illustration of an aerosol-generating system, in accordance with an example embodiment. The system includes two main elements, a cartridge 100 and a control body 200. A connection end 115 of the cartridge 100 is removably connected to a corresponding connection end 205 of the control body 200. The control body 200 contains a battery 210, which in this example embodiment is a rechargeable lithium ion battery, and control circuitry 220. The aerosol-generating device 10 is portable.

The cartridge 100 includes a housing 105 containing an atomizing assembly (also referred to as an aerosol-generating element, or vaporizer) 120 and a liquid storage compartment having a first portion 130 and a second portion 135. A liquid aerosol-forming substrate is held in the liquid storage compartment. Although not illustrated in. FIG. 1, the first portion 130 of the liquid storage compartment is connected to the second portion 135 of the liquid storage compartment so that liquid in the first portion 130 can pass to the second portion 135. The atomizing assembly 120 receives liquid from the second portion 135 of the liquid storage compartment. In this embodiment, the atomizing assembly 120 is a generally planar, fluid permeable heater assembly.

An air flow passage 140, 145 extends through the cartridge 100, from an air inlet 150 to a mouth end opening 110 in the cartridge housing 105, where the air flow passage 140 extends along the atomizing assembly 120.

The elements of the cartridge 100 are arranged so that the first portion 130 of the liquid storage compartment is between the atomizing assembly 120 and the mouth end opening 110, and the second portion 135 of the liquid storage compartment is positioned on an opposite side of the atomizing assembly 120 to the mouth end opening 110. In other words, the atomizing assembly 120 lies between the two portions 130, 135 of the liquid storage compartment and receives liquid from the second portion 135, where the first portion 130 of liquid storage compartment is closer to the mouth end opening 110 than the second portion 135 of the liquid storage compartment. The air flow passage 140 extends along the atomizing assembly 120 and between the first and second portion 130, 135 of the liquid storage compartment.

The system is configured so that a draw of aerosol can be drawn from the mouth end opening 110 of the cartridge 100. In operation, in the process of the aerosol being drawn from the mouth end opening 110, air is drawn through the airflow passage from the air inlet 150, across the atomizing assembly 120, prior to exiting the mouth end opening 110. The control circuitry 220 controls the supply of electrical power from the battery 210 to the cartridge 100 when the system is activated. This in turn controls the amount and properties of the vapor produced by the atomizing assembly 120 (also referred to as a vaporizer or vaporizing assembly). The control circuitry 220 may include an airflow sensor and the control circuitry may 220 supply electrical power to the atomizing assembly 120 when a draw of air is detected by the airflow sensor. When the draw of air travels through the cartridge 100, the atomizing assembly 120 is activated and generates a vapor that is entrained in the air flow passing through the air flow passage 140. The vapor cools within the airflow in passage 145 to form an aerosol, which is then drawn from the mouth end opening 110.

In operation, the mouth end opening 110 is typically the highest point (e.g., highest elevation) of the device. The construction of the cartridge 100, and in particular the arrangement of the atomizing assembly 120 between the first and second portions 130, 135 of the liquid storage compartment, is advantageous because it exploits gravity to ensure that the liquid substrate is delivered to the atomizing assembly 120 even as the liquid storage compartment is becoming depleted, but prevents an oversupply of liquid to the atomizing assembly 120 which might lead to leakage of liquid into the air flow passage 140.

Figure 2A:
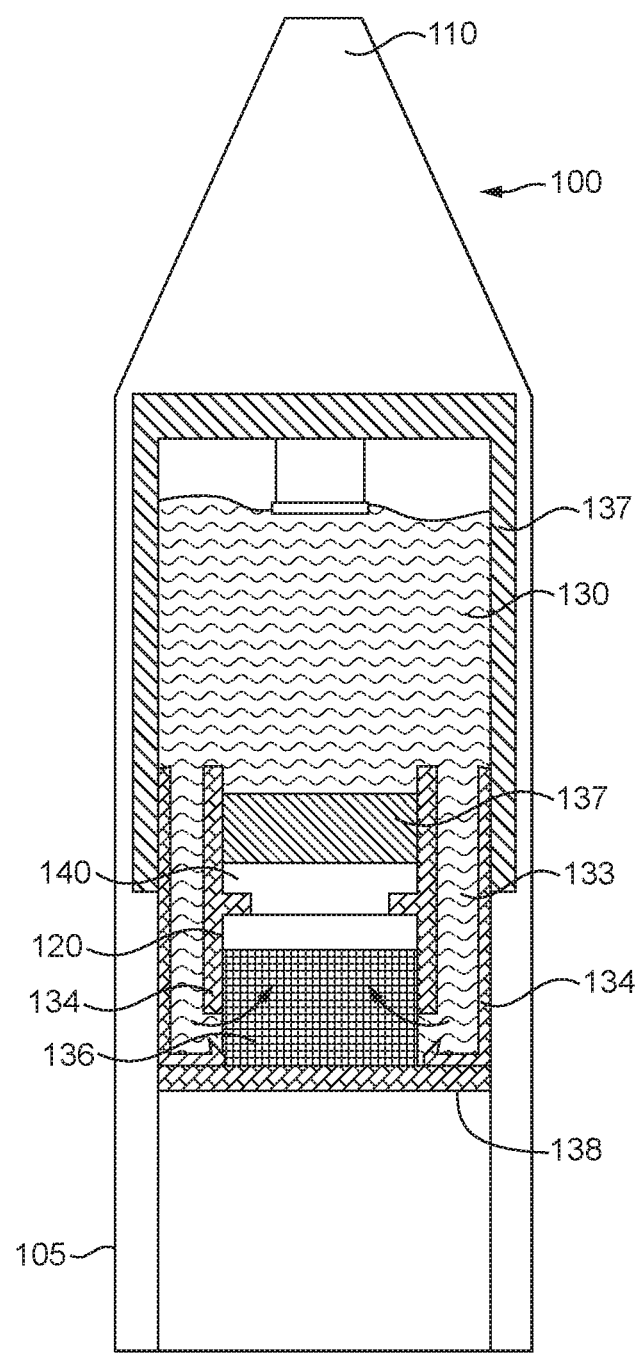
FIG. 2A illustrates a first cross-section of a cartridge, including a mouthpiece, in accordance with an example embodiment.
Figure 2B:
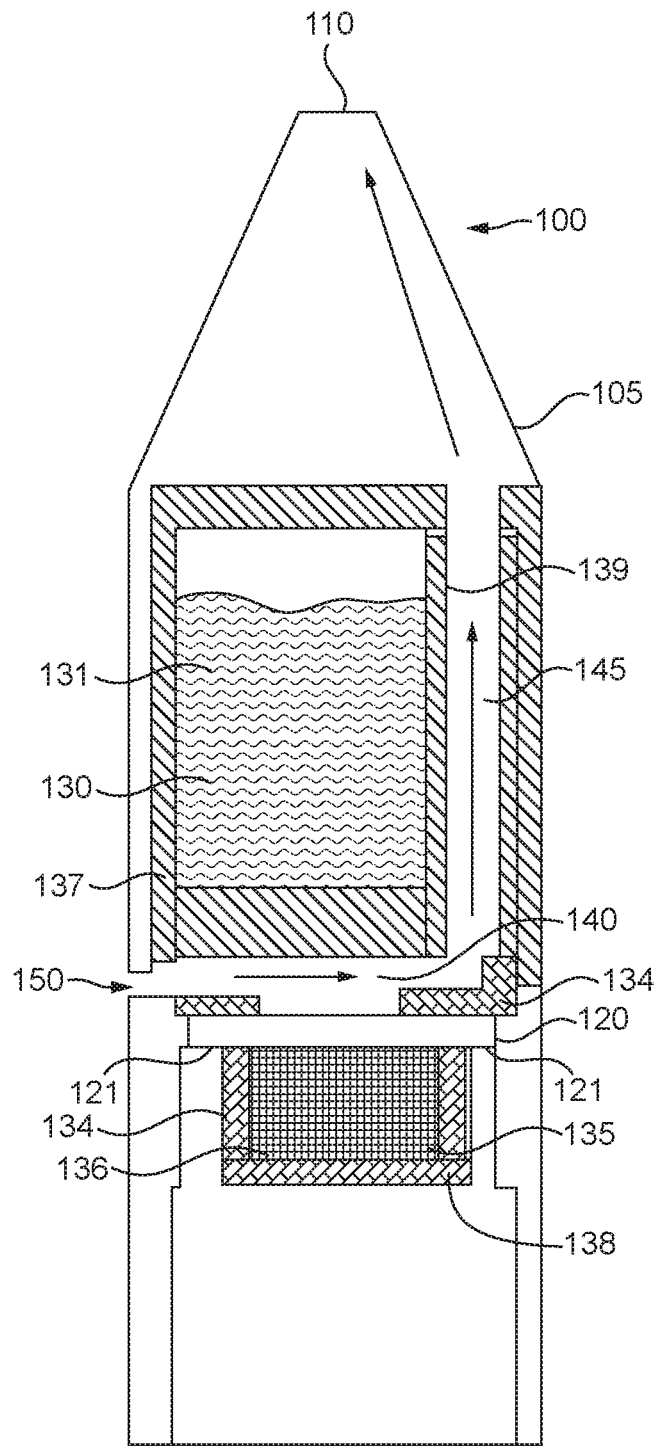
FIG. 2B illustrates a second cross-section of a cartridge, in accordance with an example embodiments.

FIG. 2A illustrates a first cross section of a cartridge in accordance with an example embodiment. FIG. 2B illustrates a second cross section, orthogonal to the cross section of FIG. 2A.

The cartridge 100 of FIG. 2A includes an external housing 105 having a mouth end with a mouth end opening 110, and a connection end opposite the mouth end. Within the housing 105 is the liquid storage compartment holding a liquid aerosol-forming substrate 131. The liquid is contained in the liquid storage compartment by three elements, an upper storage compartment housing 137, a heater mount 134 and an end cap 138. A heater assembly 120 is held in the heater mount 134. A capillary material 136 is provided in the second portion 135 of the liquid storage compartment, and abuts the heater element 121 in a central region of the heater assembly 120. The capillary material 136 is oriented to transport liquid to the heater element 121. The heater element 121 includes a mesh heater element, formed from a plurality of filaments. Details of this type of heater element construction can be found in international published application number WO2015/117702, which is incorporated by reference in its entirety. An airflow passage 140 extends between the first and second portions 130, 135 of the liquid storage compartment. A bottom wall of the airflow passage 140 includes the heater element 121 and the heater mount 134, side walls of the airflow passage 140 include portions of the heater mount 134, and a top wall of the airflow passage 140 includes a portion of the upper storage compartment housing 137. The air flow passage 130 has a vertical portion 145 that extends through the first portion 130 of the liquid storage compartment, as shown in FIG. 2A, towards the mouth end opening 110.

The heater assembly 20 is generally planar and has two faces. A first face of the heater assembly 120 faces the first portion 130 of the liquid storage compartment and the mouth end opening 110. A second face of the heater assembly 120 is in contact with the capillary material 136 and the liquid 131 in the liquid storage compartment, and faces a connection end 115 of the cartridge 100. The heater assembly 120 is closer to the connection end so that electrical connection of the heater assembly 120 to a power supply can be easily and robustly achieved, as will be described. The first portion 130 of the liquid storage compartment is larger than the second portion 135 of the liquid storage compartment and occupies a space between the heater assembly 120 and the mouth end opening 110 of the cartridge 100. Liquid in the first portion 130 of the liquid storage compartment can travel to the second portion 135 of the liquid storage compartment through liquid channels 133 on either side of the heater assembly 120. Two channels are provided in this example embodiment to provide a symmetric structure, although only one channel is necessary. The channels are enclosed liquid flow paths defined between the upper storage compartment housing 137 and the heater mount 134.

Figure 3:
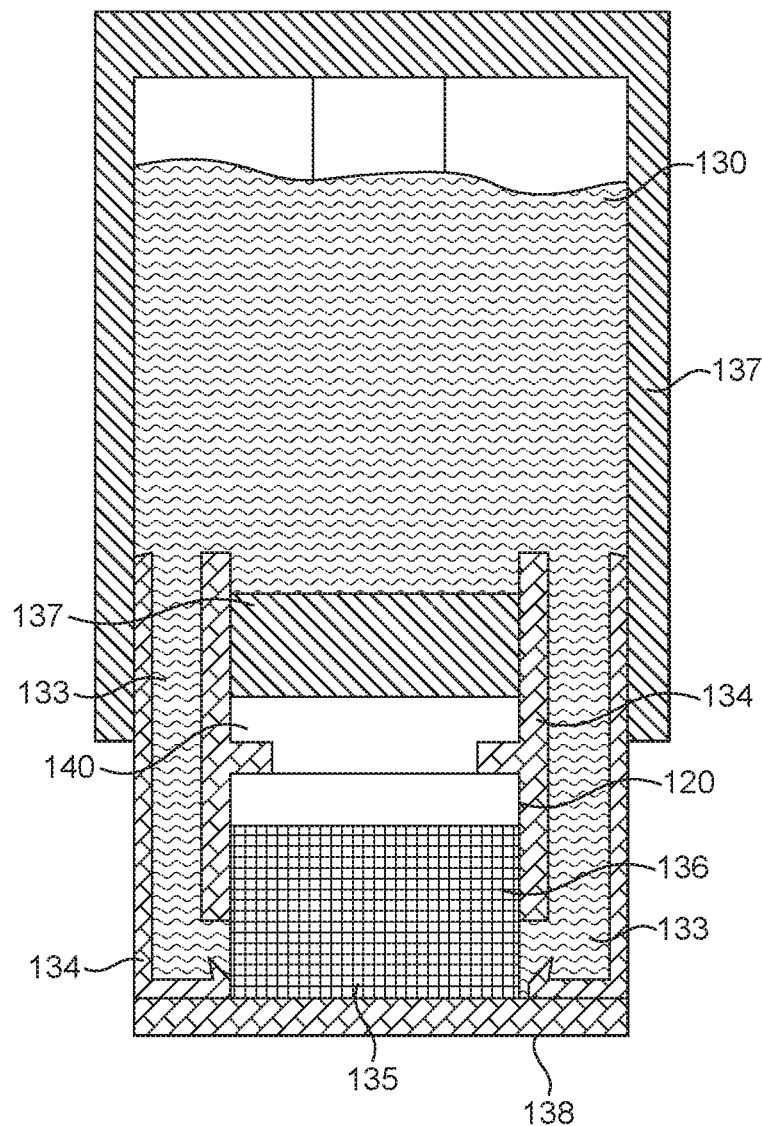
FIG. 3 illustrates a cartridge without a mouthpiece, in accordance with an example embodiment.

FIG. 3 is an illustration of an enlarged view of the liquid storage compartment and heater assembly 120 of the cartridge 100 shown in FIGS. 2A and 2B. It is possible to provide a cartridge including the elements shown in FIG. 3, without an external housing 105 or mouthpiece. A mouthpiece may be provided as a separate element to the cartridge 100 or may be provided as part of the control body 200, with a cartridge as shown in FIG. 3 configured to be inserted into the control body 200.

Figure 6A:
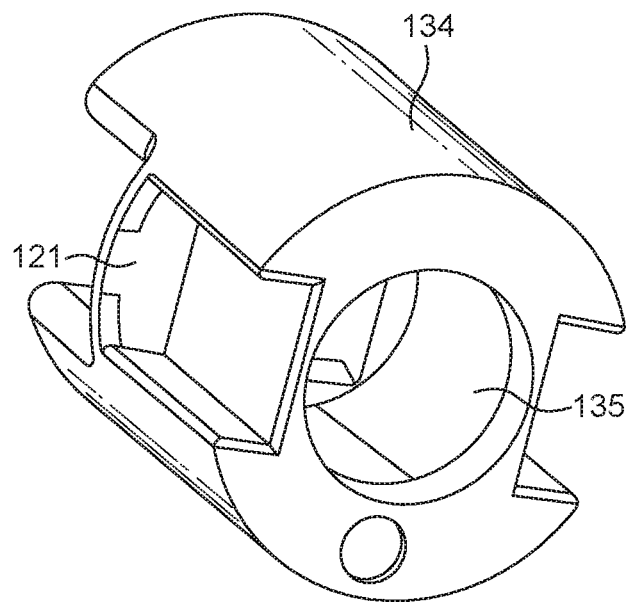
FIG. 6A is a bottom view of the heater assembly and heater mount of FIG. 4A, in accordance with an example embodiment.
Figure 6B:
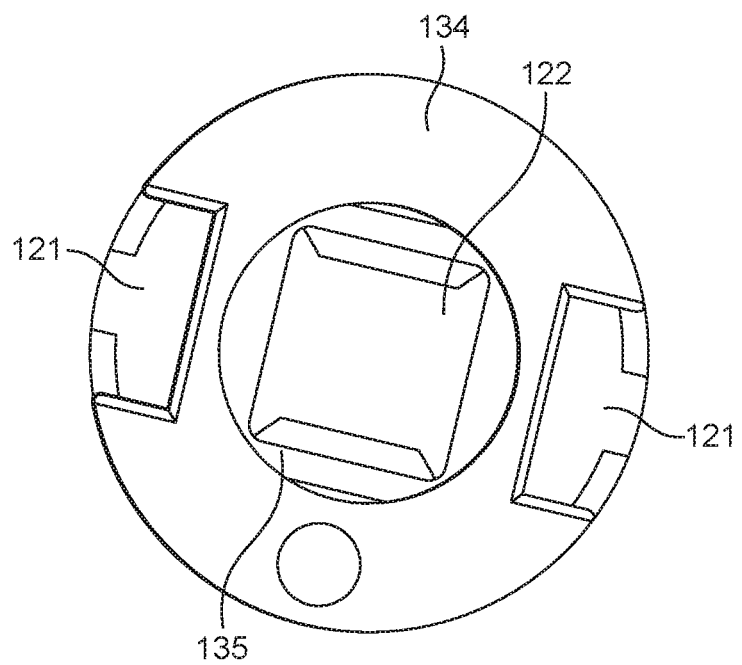
FIG. 6B is a bottom view of the heater assembly and heater mount of FIG. 4B, in accordance with an example embodiment.

The cartridge 100 shown in FIG. 3 may be assembled by first molding the heater mount 134 around the heater assembly 120. The heater assembly includes a mesh heater element 122 as described, fixed to a pair of tin contact pads 121, which have a much lower electrical resistivity than the heater element 122. The contact pads 121 are fixed to opposite ends of the heater element 122, as illustrated in FIGS. 6A and 6B. The heater mount 134 is then fixed to the upper storage portion housing using welding or adhesive. The capillary material 136 is inserted into the second portion 135 of the liquid storage compartment. The end cap 138 is then fixed to the heater mount to seal the liquid storage compartment.

Figure 4A:
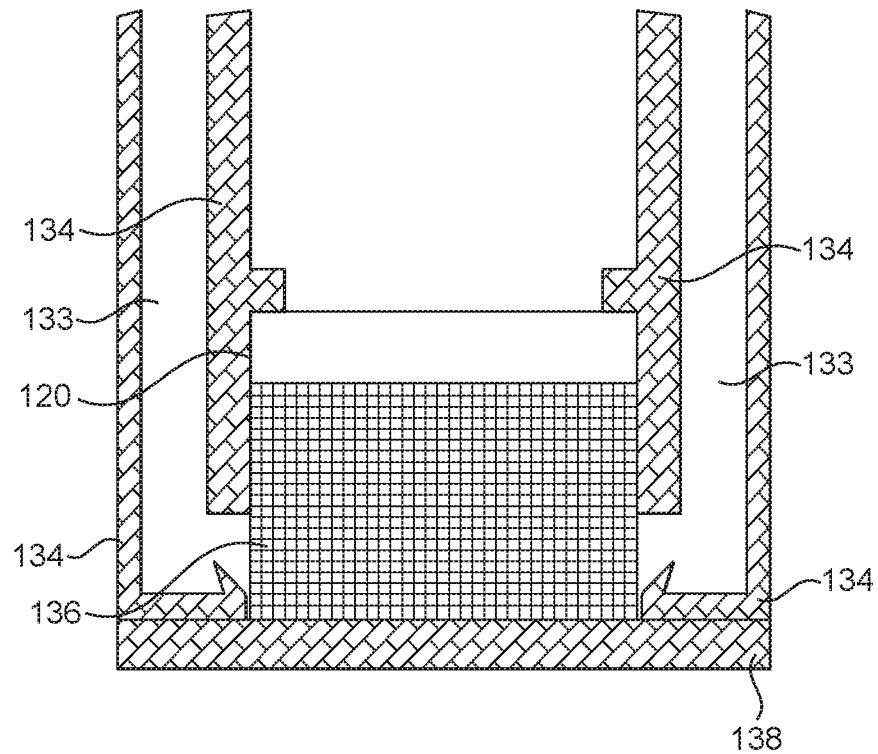
FIG. 4A illustrate the heater mount of FIG. 2A, in accordance with an example embodiment.

Alternatively, the heater mount capillary material 136 and end cap 138 can be assembled first before being fixed to the upper storage portion housing. FIG. 4A is a first cross section of the heater assembly 120, heater mount 134, capillary material 136 and end cap 138. The liquid channels 133 are clearly shown. FIG. 48 is a second cross section of the heater assembly 120, heater mount 134, capillary material 136 and end cap 138. It can be seen that the heater mount 134 secures the heater assembly 120 on both sides of the heater assembly 120. The contact pads 121 are easily accessible from the second side of the heater assembly 120 but are covered by the heater mount on the first side of the heater assembly 120 to protect them from vapor in the air flow passage 140. A lower wall of the heater mount 134 extends from the second side of the heater assembly 120 and isolates the contact pads 121 from the liquid in the second portion 135 of the liquid storage compartment.

Figure 4B:
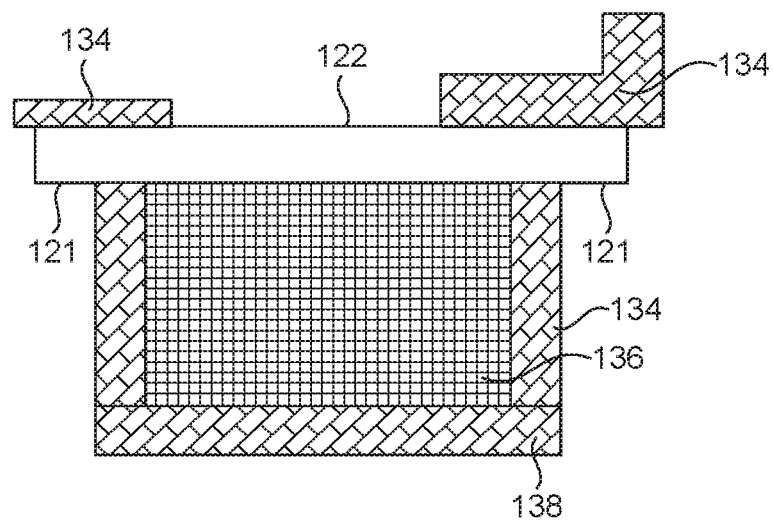
FIG. 4B illustrate the heater mount of FIG. 2B, in accordance with an example embodiment.
Figure 5A:
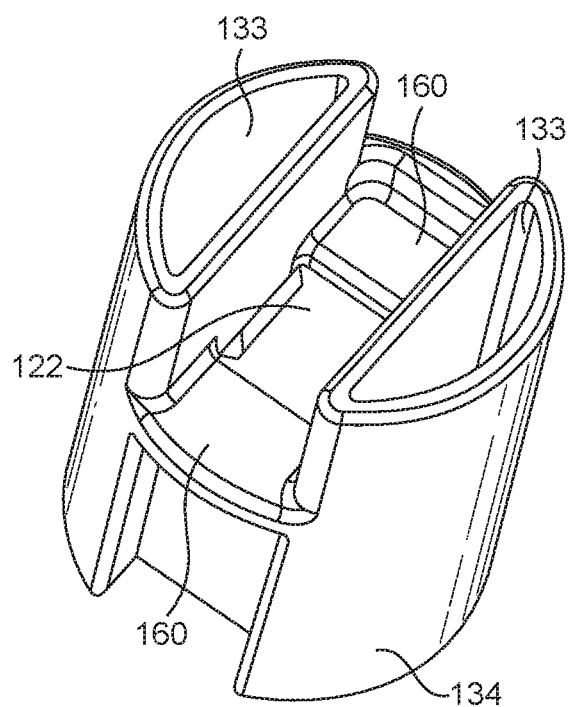
FIG. 5A is a top perspective view of the heater assembly and heater mount of FIG. 4A, in accordance with an example embodiment.
Figure 5B:
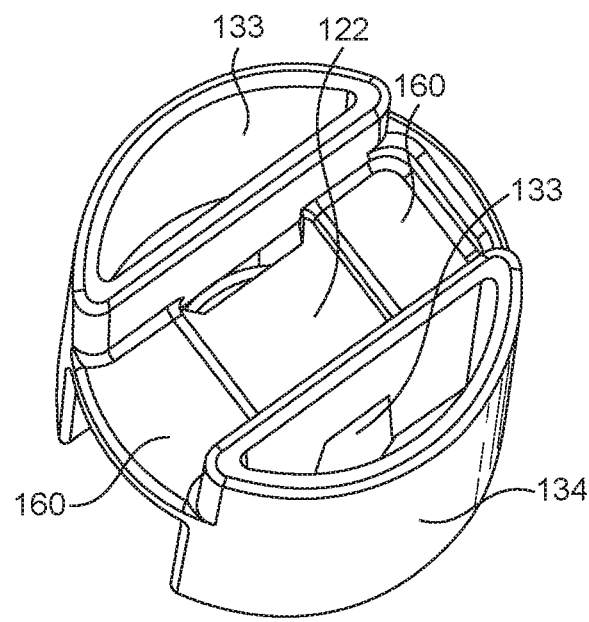
FIG. 5B is a top perspective view of the heater assembly and heater mount of FIG. 4B, in accordance with an example embodiment.

The heater mount 134 and heater assembly 120 are illustrated in more detail in FIGS. 5A, 5B, 6A and 613. FIGS. 5A and 5B are top perspective views of the heater assembly 120 and heater mount 134 of FIGS. 4A and 4B. FIGS. 6A and 6B are bottom views of the heater assembly 120 and heater mount 134 of FIGS. 4A and 4B. The end cap 138 and capillary material 136 are removed.

FIGS. 5A and 5B illustrate covering surfaces 160 of the heater mount 134 that cover the first side of the contacts portions 121 of the heater assembly 120, while the mesh heater element 122 is exposed. Liquid channels 133 from the first portion 130 of the liquid storage compartment to the second portion 135 of the liquid storage compartment are defined by vertical walls of the heater mount 134. The same walls also bound the airflow passage 140 as the airflow passage 140 passes over the heater element 120.

The heater mount is injection molded and formed from an engineering polymer, such as polyetheretherketone (PEEK) or LCP (liquid crystal polymer).

FIGS. 6A and 6B illustrate how the heater mount 134 isolates the contact pads 121 from the second portion 135 of the liquid storage compartment but allow the contact pads 121 to be accessible. A wall of the heater mount 134 isolates the contact portions 121 from the liquid in the storage portion. The heater mount 134 also isolates the exposed portion of the contact pads 121 from the air flow passage 140.

The overmolding of the heater mount 134 on the heater assembly 120 provides a robust element that can be easily handled during assembly of the system without damaging delicate portions of the heater element 134.

The liquid may be inserted into the liquid storage compartment from the bottom end, before the end cap 138 is fixed, or through a filling port (not shown) in the upper storage portion housing, after the end cap 138 is fixed. The liquid storage compartment may be refillable through a filling port.

The liquid storage compartment may then be fixed inside a cartridge housing 105 using a mechanical fixing or using another means, such as adhesive or welding for example. Alternatively, the storage compartment may be fixed to or removably coupled to the housing of a control body of an aerosol-generating system.

Figure 7:
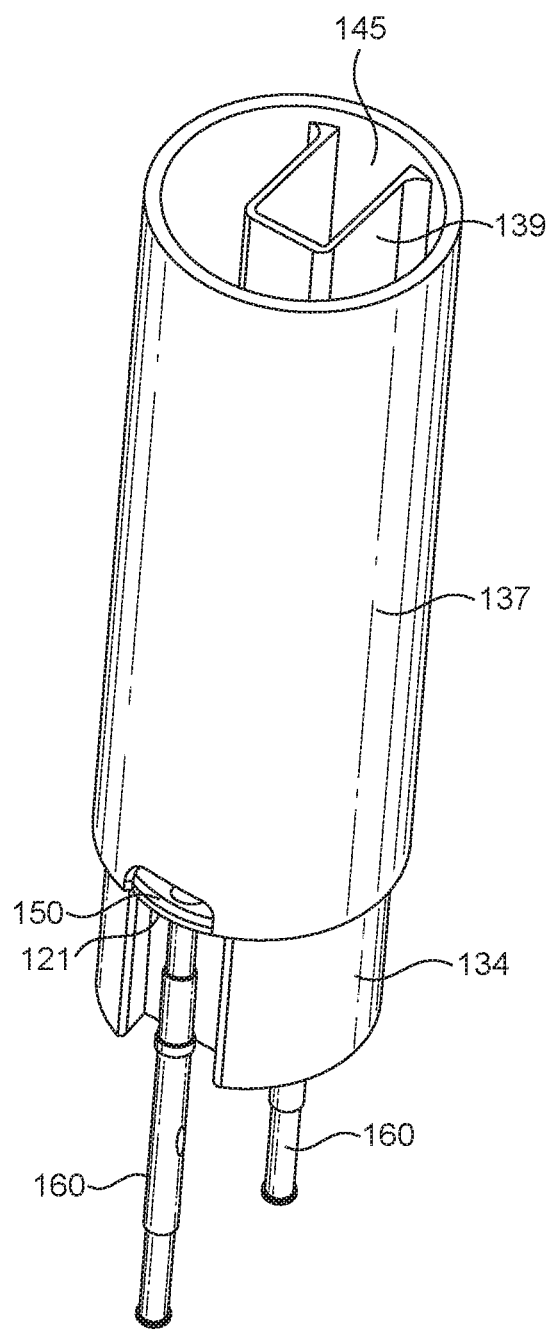
FIG. 7 illustrates the electrical connection of a control body to the heater assembly, in accordance with an example embodiment.

FIG. 7 illustrates how electrical contacts in a control body of an aerosol-generating system can be arranged to mate with the exposed contact pads of the heater assembly 120. Only the electrical contacts of the control body 200 are shown. The electrical contacts include a pair of spring loaded pins 160 that extend in the slots formed on either side of the heater mount 134 to contact the contact pads 121. With this arrangement the cartridge 100 can be inserted in or joined to the control body 200 by moving the cartridge 100 into contact with the pins in an insertion direction parallel to the longitudinal axis of the pins. When the pins are in contact with the contact pads 121, electrical current can be delivered to the heating element 122. The cartridge 100 may be retained within a control body housing or may be fixed to the control body using a push fitting or snap fitting.

FIG. 7 also illustrates a cut away portion of the upper storage compartment housing 137. It can be seen that an internal wall 139 is used to divide the airflow passage 145 from the liquid 131 within the liquid storage compartment. The air inlet 150 is also clearly illustrated.

The operation of the system will now be briefly described. The system is first switched on using a switch on the control body 200 (not shown in FIG. 11. The system may include an airflow sensor in fluid communication with the airflow passage that can be activated by sensing the airflow. This means that the control circuitry 220 is configured to supply power to the heating element 122 based on signals from the airflow sensor that can sense a draw of air. Alternatively, the supply of power to the heating element 122 may be based on actuation of a switch. When power is supplied to the heating element 122, the heating element 122 heats to temperature above a vaporization temperature of the liquid aerosol-forming substrate 131. The liquid aerosol-forming substrate 131 vaporized by the heating element 122 flows into the airflow passage 140. The mixture of air drawn in through the air inlet 150 and the vapor from the heating element 122 is drawn through the airflow passage 140, 145 towards the mouth end opening 110. As it travels through the airflow passage 140, 145 the vapor cools to form an aerosol, which is then drawn from the cartridge 100. At the end of the draw of air, or after a set time period, power to the heating element 122 is cut and the heater cools.

During normal operation in this manner, and between draws of air, the system is typically held so that the mouth end of the system is the highest elevation of the cartridge 10-0. This means that the first portion 130 of the liquid storage compartment is above the second portion 135 of the liquid storage compartment, and the heating element is above the capillary material 136 in the second portion 135 of the liquid storage compartment. As liquid in the capillary material 136 close to the heating element 122 is vaporised and flows into the airflow passage 140, it is replenished by liquid from the first portion 130 of the liquid storage compartment flowing into the capillary material 136 under the influence of gravity. The liquid from the first portion 130 flows through the two enclosed liquid flow paths 133 into the capillary material 136. The capillary material 136 then draws the liquid up to the heating element 122. The direction of travel of the liquid is illustrated by the arrows in FIG. 2A.

Although the example embodiments have been described in relation to a system including a control body and a separate but connectable cartridge, it should be clear that the arrangement of the heater mount molded on the heater assembly, and the configuration of the liquid storage compartment, airflow passage and heater assembly could be used in a one-piece aerosol-generating system.

It should also be clear that alternative geometries are possible within the scope of the example embodiments. In particular, the airflow passage may extend through the first portion of the storage compartment in a different manner, such as through a center of the liquid storage compartment. The cartridge and liquid storage compartment may have a different cross-sectional shape and the heater assembly may have a different shape and configuration.

An aerosol-generating system having the construction described has several advantages. The possibility of liquid leaking into the air flow passage is reduced by the arrangement of the first and second portions of the liquid storage compartment. The possibility of liquid or vapor damaging or corroding the electrical contact portions is significantly reduced by the construction of the heater mount. The construction is robust and inexpensive and results in a minimal waste of the liquid aerosol-forming substrate.

The specific embodiments and examples described above illustrate but do not limit the example embodiments. It is to be understood that other embodiments may be made, and the specific embodiments and examples described herein are not exhaustive.

The invention claimed is:

1. A cartridge for an aerosol-generating system, the cartridge comprising:
   a storage compartment configured to contain a liquid, the storage compartment having a first portion and a second portion connected to one another by a liquid channel, the liquid channel being configured to communicate the liquid from the first portion to the second portion;
   an airflow passage passing between the first portion and the second portion of the storage compartment; and
   an aerosol-generating element on an end of the second portion, the aerosol-generating element being fluid permeable, the aerosol-generating element having a first side and a second side that oppose each other, the first side forming part of the airflow passage that is between the first portion and the second portion, the second side being in contact with the liquid from the second portion of the storage compartment, the storage compartment and liquid channel being configured to allow the liquid in the first portion to pass to the second portion through the liquid channel while the cartridge is in operational use.

2. The cartridge of claim 1, wherein the first portion of the storage compartment has a larger liquid storage capacity than the second portion of the storage compartment.

3. The cartridge of claim 1, wherein the second portion of the storage compartment contains a capillary material in contact with the second side of the aerosol-generating element.

4. The cartridge of claim 1, wherein the cartridge further comprises:
   a housing having a connection end and a mouth end remote from the connection end, the connection end configured to connect to a control body of an aerosol-generating system, the second side of the aerosol-generating element facing the connection end and the first side of the aerosol-generating element facing the mouth end.

5. The cartridge of claim 4, wherein the aerosol-generating element is closer to the connection end than to the mouth end.

6. The cartridge of claim 1, further comprising:
   a housing defining an air inlet; and
   a mouthpiece portion having a mouth end opening, the airflow passage extending from the air inlet, between the first portion and the second portion of the storage compartment, to the mouth end opening, wherein the first portion of the storage compartment is positioned between the aerosol-generating element and the mouth end opening.

7. The cartridge of claim 1, wherein the first side and the second side of the aerosol-generating element are planar.

8. The cartridge of claim 1, wherein the aerosol-generating element is a heating element, the heating element defining a fluid passage that is at least one of a plurality of interstices and apertures, the fluid passage extending through the heating element.

9. The cartridge of claim 8, further comprising:
a heater assembly, the heater assembly including,
the heating element, and
electrical contacts, the electrical contacts electrically connected to the heating element.

10. The cartridge of claim 9, wherein the electrical contacts are exposed through a connection end of the cartridge.

11. The cartridge of claim 9, wherein the storage compartment further comprises:
a heater mount, the heater mount being molded over the heater assembly.

12. The cartridge of claim 1, wherein the first portion of the storage compartment, the second portion of the storage compartment and the liquid channel is configured to allow the liquid in the first portion of the storage compartment to reach the aerosol-generating element only through the second portion of the storage compartment.

13. An aerosol-generating system, comprising:
a cartridge including,
a storage compartment configured to contain a liquid, the storage compartment having a first portion and a second portion connected to one another by a liquid channel, the liquid channel being configured to communicate the liquid from the first portion to the second portion;
an airflow passage passing between the first portion and the second portion of the storage compartment; and
an aerosol-generating element on an end of the second portion, the aerosol-generating element being fluid permeable, the aerosol-generating element having a first side and a second side that oppose each other, the first side forming part of the airflow passage that is between the first portion and the second portion, the second side being in contact with the liquid from the second portion of the storage compartment, the storage compartment and liquid channel being configured to allow the liquid in the first portion to pass to the second portion through the liquid channel while the aerosol-generating system is in operational use; and
a control body connected to the cartridge, the control body configured to control a supply of electrical power to the aerosol-generating element.

14. The aerosol-generating system of claim 13, further comprising:
a first pair of electrical contacts in the control body; and
a second pair of electrical contacts in the cartridge, the first and second pair of electrical contacts being configured to electrically connect the control body to the aerosol-generating element.

15. The aerosol-generating system of claim 13, wherein the aerosol- generating system is a handheld aerosol-generating system.

16. The cartridge of claim 1, wherein the storage compartment and liquid channel are configured to allow the liquid in the first portion to pass to the second portion through the liquid channel, at least in part due to gravity, while the cartridge is in operational use.

17. The aerosol-generating system of claim 13, wherein the storage compartment and liquid channel are configured to allow the liquid in the first portion to pass to the second portion through the liquid channel, at least in part due to gravity, while the cartridge is in operational use.

* * * * *